(12) United States Patent
Jones et al.

(10) Patent No.: US 7,120,758 B2
(45) Date of Patent: Oct. 10, 2006

(54) TECHNIQUE FOR IMPROVING PROCESSOR PERFORMANCE

(75) Inventors: Phillip M. Jones, Spring, TX (US); Robert A. Lester, Tomball, TX (US); Jens K. Ramsey, Cypress, TX (US); William J. Walker, Houston, TX (US); John E. Larson, Houston, TX (US); James Andre, Houston, TX (US); Paul Rawlins, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 507 days.

(21) Appl. No.: 10/365,018

(22) Filed: Feb. 12, 2003

(65) Prior Publication Data

US 2004/0158685 A1 Aug. 12, 2004

(51) Int. Cl.
*G06F 12/00* (2006.01)
*G06F 3/00* (2006.01)

(52) U.S. Cl. .................. 711/147; 711/100; 710/52; 710/54; 710/56

(58) Field of Classification Search ............... 711/147, 711/100, 148, 154; 710/52, 56, 54
See application file for complete search history.

(56) References Cited

U.S. PATENT DOCUMENTS

| 5,619,675 A * | 4/1997 | De Martine et al. ........ 711/133 |
| 2002/0087849 A1* | 7/2002 | Arimilli et al. ............ 712/235 |
| 2003/0005242 A1* | 1/2003 | Dover ........................ 711/158 |

* cited by examiner

*Primary Examiner*—Kimberly McLean-Mayo (57) ABSTRACT

Method and apparatus for improving processor performance. In some embodiments, processing speed may be improved by reusing data stored in a buffer during an initial request by subsequent requests. Assignment of temporary storage buffers in a controller may be made to allow for the potential for reuse of the data. Further, a hot buffer may be designated to allow for reuse of the data stored in the hot buffer. On subsequent requests, data stored in the hot buffer may be sent to a requesting device without re-retrieving the data from memory.

26 Claims, 9 Drawing Sheets

TECHNIQUE FOR IMPROVING PROCESSOR PERFORMANCE

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

With the advent of standardized architectures and operating systems, computers have become virtually indispensable for a wide variety of uses from business applications to home computing. Whether a computer system is a personal computer or a network of computers connected via a server interface, computers today rely on processors, associated chip sets, and memory chips to perform most of the processing functions, including the processing of system requests. The more complex the system architecture, the more difficult it becomes to process requests in the system efficiently. Despite the increasing complexity of system architectures, demands for improved request processing speed continue to drive system design.

Some systems include multiple processing units or microprocessors connected via a processor bus. To coordinate the exchange of information among the processors, a host/data controller is generally provided. The host/data controller is further tasked with coordinating the exchange of information between the plurality of processors and the system memory. The host/data controller may be responsible not only for the exchange of information in the typical Read-Only Memory (ROM) and the Random Access Memory (RAM), but also the cache memory in high speed systems. Cache memory is a special high speed storage mechanism which may be provided as a reserved section of the main memory or as an independent high-speed storage device. Essentially, the cache memory is a portion of the RAM which is typically made of high speed static RAM (SRAM) rather than the slower and cheaper dynamic RAM (DRAM) which may be used for the remainder of the main memory. Alternatively, cache memory may be located in each processor. By storing frequently accessed data and instructions in the cache memory, the system may minimize its access to the slower main memory and thereby may increase the request processing speed in the system.

The host/data controller may be responsible for coordinating the exchange of information among several buses, as well. For example, the host controller may be responsible for coordinating the exchange of information from input/output (I/O) devices via an I/O bus. Further, systems may implement split processor buses, which means that the host controller is tasked with exchanging information between the I/O bus and a plurality of processor buses. Due to the complexities of the ever expanding system architectures which are being introduced in today's computer systems, the task of coordinating the exchange of information becomes increasingly difficult. Because of the increased complexity in the design of the host controller due to the increased complexity of the system architecture, more cycle latency may be injected into the cycle time for processing system requests among the I/O devices, processing units, and memory devices which make up the system.

The present invention may address one or more of the problems set forth above.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
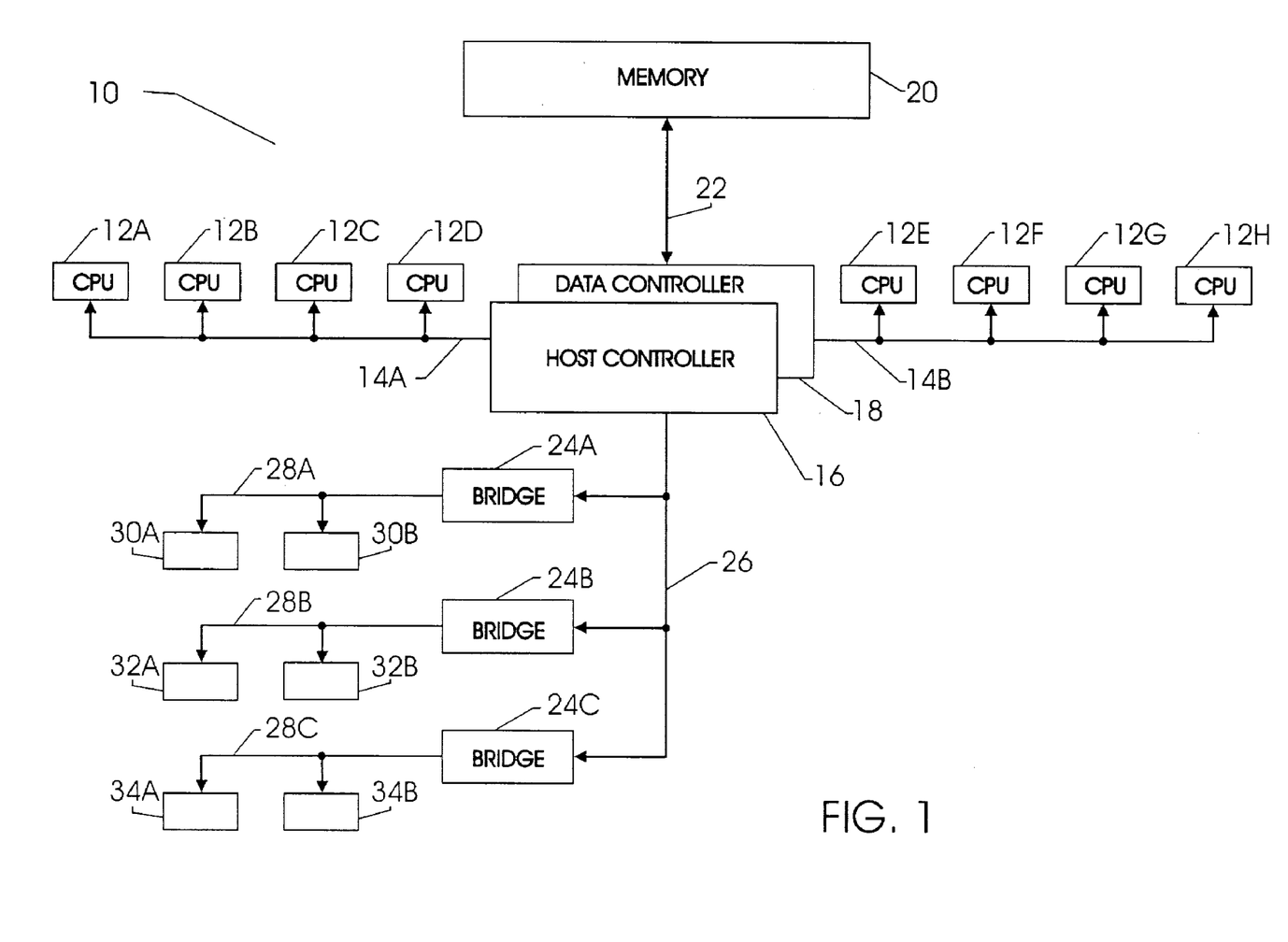
FIG. 1 is a block diagram illustrating an exemplary computer system having a multiple processor bus architecture according to the embodiments of the present invention.

Turning now to the drawings and referring initially to FIG. 1, a block diagram of an exemplary computer system with multiple processor buses and an I/O bus, generally designated as reference numeral 10, is illustrated. The computer system 10 typically includes one or more processors or CPUs. In the exemplary embodiment, the system 10 may utilize eight CPUs 12A–12H. The system 10 may utilize a split-bus configuration in which the CPUs 12A–12D are coupled to a first bus 14A and the CPUs 12E–12H are coupled to a second bus 14B. It should be understood that the processors or CPUs 12A–12H may be of any suitable type, such as a microprocessor available from Intel, AMD, or Motorola, for example. Each CPU 12A–12H may include a segment of cache memory for storage of frequently accessed data and programs. Furthermore, any suitable bus configuration may be coupled to the CPUs 12A–12H, such as a single bus, a split-bus (as illustrated), or individual buses. By way of example, the exemplary system 10 may utilize Intel Pentium IV processors and the buses 14A and 14B may operate at 100/133 MHz.

Each of the buses 14A and 14B may be coupled to a chip set which includes a host controller 16 and a data controller 18. In this embodiment, the data controller 18 may be effectively a data cross-bar slave device controlled by the host controller 16. The data controller 18 used to store data awaiting transfer from one area of the system 10 to a requesting area of the system 10. Because of the master/slave relationship between the host controller 16 and the data controller 18, the chips may be referred to together as the host/data controller 16, 18.

The host/data controller 16, 18 is coupled to main memory 20 via a memory bus 22. The memory 20 may include one or more memory devices, such as dynamic random access memory (DRAM) devices, configured to store data. The memory devices may be configured on one or more memory modules, such as dual inline memory modules (DIMMs). Further, the memory modules may be configured to form a memory array including redundant and/or hot pluggable memory segments. The memory 20 may also include one or more memory controllers (not shown) to coordinate the exchange of requests and data between the memory 20 and a requesting device such as a CPU 12A–12H or I/O device.

The host/data controller 16, 18 is typically coupled to one or more bridges 24A–24C via an Input/Output (I/O) bus 26. The opposite side of each bridge 24A–24C may be coupled to a respective bus 28A–28C, and a plurality of peripheral devices 30A and 30B, 32A and 32B, and 34A and 34B may be coupled to the respective buses 28A, 28B, and 28C. The bridges 24A–24C may be any of a variety of suitable types, such as PCI, PCI-X, EISA, AGP, etc.

Figure 2:
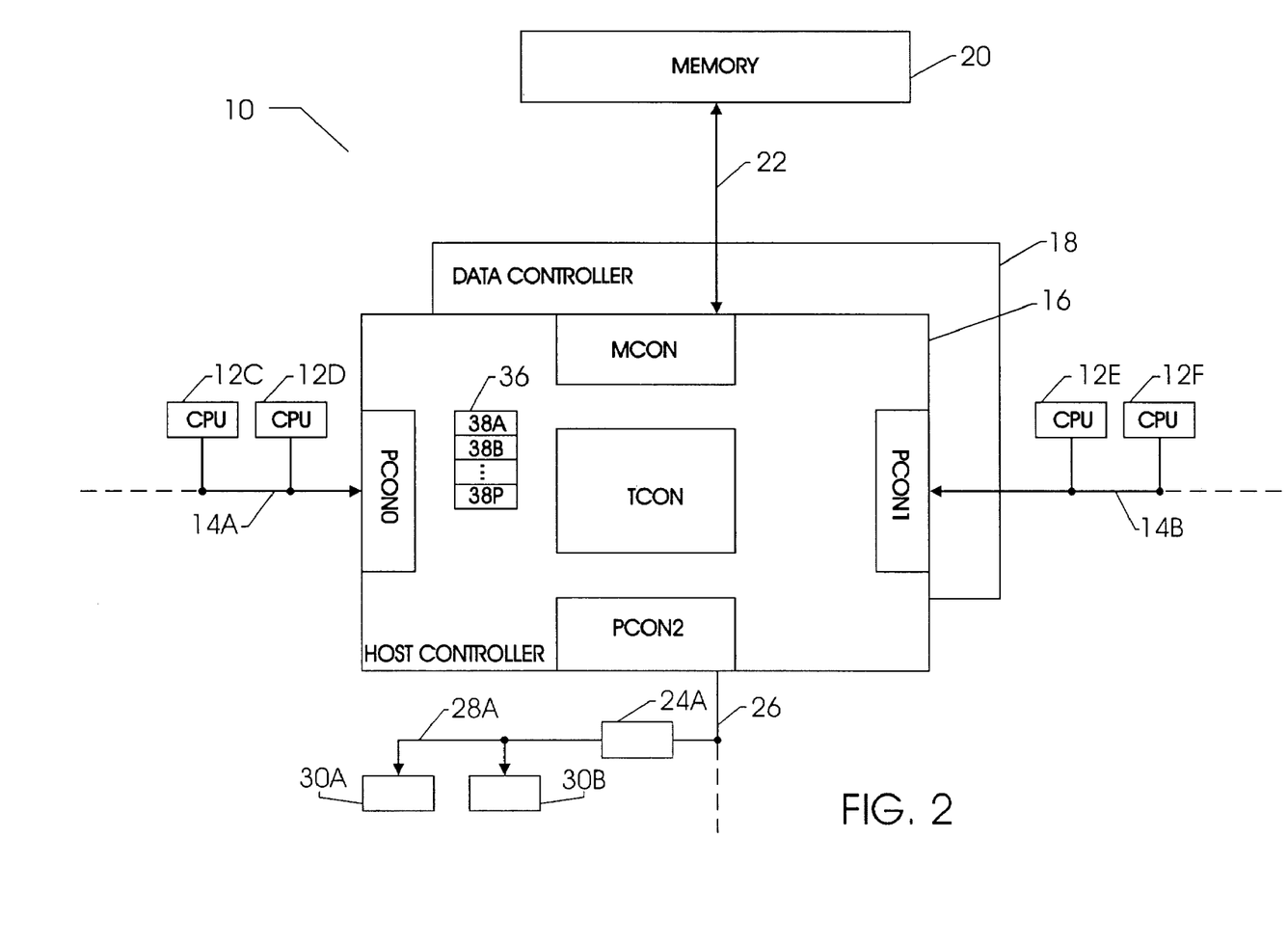
FIG. 2 is a block diagram illustrating an exemplary host controller in accordance with embodiments of the present invention.

FIG. 2 illustrates a block diagram of the host/data controller 16, 18. As can be appreciated, each of the components illustrated and described with reference to the host controller 16 may have a corresponding companion component in the data controller 18. The functionality of each component may be described generally with respect to the host controller 16, which may be configured to receive requests and to coordinate the exchange of requested data through the data controller 18. The host controller 16 generally coordinates the exchange of requests and data from the processor buses 14A and 14B, the I/O bus 26, and the memory bus 22.

The host controller 16 may include a memory controller MCON that facilitates communication with the memory 20. The host controller 16 may also include a processor controller PCON for each of the processor and I/O buses 14A, 14B, and 26. For simplicity, the processor controller corresponding to the processor bus 14A is designated as "PCON0." The processor controller corresponding to the processor bus 14B is designated as "PCON1." The processor controller corresponding to the I/O bus 26 is designated as "PCON2." Essentially, each processor controller PCON0–PCON2 serves to connect a respective bus external to the host controller 16 (i.e., processor bus 14A and 14B and I/O bus 26) to the internal blocks of the host controller 16. Thus, the processor controllers PCON0–PCON2 facilitate the interface from the host controller 16 to each of the buses 14A, 14B, and 26. Further, in an alternate embodiment, a single processor controller PCON may serve as the interface for all of the system buses 14A, 14B, and 26. The processor controllers PCON0–PCON2 may be referred to collectively as "PCON." Any number of specific designs for the processor controller PCON and the memory controller MCON may be implemented in conjunction with the techniques described herein, as can be appreciated by those skilled in the art.

The host controller 16 may also include a tag controller TCON. The tag controller TCON maintains coherency and request cycle ordering in the system 10. "Cache coherence" refers to a protocol for managing the caches in a multiprocessor system so that data is not lost or over-written before the data is transferred from the cache to a requesting or target device. Because frequently accessed data may be stored in the cache memory, a requesting agent should be able to identify which area of the memory (cache or non-cache) should be accessed to retrieve the requested information as efficiently as possible. A "tag RAM" (FIG. 3) may be provided to identify which data from the main memory is currently stored in each processor cache associated with each memory segment. The tag RAM essentially provides a directory to the data stored in the processor caches. The tag controller TCON maintains coherency in cycle ordering and controls access to the tag RAM. Any number of specific designs for a tag controller TCON for maintaining coherency may be implemented in conjunction with the techniques described herein, as can be appreciated by those skilled in the art.

The host controller 16 may also include one or more queues 36 which may be reserved to temporarily store address information corresponding to data after the data is sent from the memory 20 (or cache), but before it is delivered to the requesting device. Each queue 36 may comprise a number of storage slots, which may be referred to herein as buffers 38A, 38B, etc. In some embodiments, the queue 36 may comprise 16 buffers 38A–38P. The number of queues 36 and the number of buffers 38 in each queue 36 may vary depending on the architecture and design of the system 10. As can be appreciated, the queue 36 in the host controller 16 may be implemented to store address information corresponding to the data stored in a corresponding queue 36 in the data controller 18 (illustrated in FIGS. 4–9).

During a typical read operation, a requesting device such as the CPU 12D or the peripheral device 30A, for example, may initiate read requests to the host controller 16. The respective processor controller PCON sends the request to each of the memory controller MCON and the tag controller TCON. The memory controller MCON passes the request to the memory 20 to obtain the requested data. Concurrently, the tag controller TCON may send a tag lookup request to the tag RAM to determine whether the requested data is currently stored in one of the processor caches. Generally speaking, if the address corresponding to the requested data is found in the tag RAM and the data is valid (unmodified) data, the request to the memory 20, which generally takes longer to access as previously described, is canceled and the data is retrieved from the cache memory. Regardless of where the requested data is found, it may be delivered to the host/data controller 16, 18 for temporary storage in one of the buffers 38A–38P to await delivery to the requesting device once the request can be completed. After the data is delivered from the buffer 38A–38P to the requesting device, the buffer may be returned for reassignment on future read cycles. Though the initial request is complete and the buffer is available for reassignment, the read data may persist in the buffer until the buffer is reused. Regardless of what data is stored in the buffers 38A–38P, conventional systems may access the memory 20 or processor caches during a read request, which may incur additional read latency if the data requested in a subsequent request persists in one of the buffers 38A–38P and can therefore be sent from the host/data controller 16, 18 without re-retrieving the data.

The present technique improves request processing speed and thereby improves system performance by maximizing the persistence of data in each buffer 38A–38P. As a preliminary process improvement, the advantages of data persistence may be realized by tracking the data persistence in the buffer 38A–38P until the buffer 38A–38P is reused. If subsequent read requests are directed to data currently stored in the buffers 38A–38P and the data is coherent, the data can be retrieved from the buffer 38A–38P rather than from memory. As can be appreciated, retrieving the data from the buffer 38A–38P may be faster than retrieving it from main memory 20 or one of the processor caches. Thus, by simply checking data stored in the buffers 38A–38P each time a read request is received, read request latency may be reduced. If the requested data is found in one of the buffers 38A–38P, the data may be sent from the buffer 38A–38P without re-retrieving the same data from main memory 20 or cache memory.

Another mechanism for improving request processing is to increase the persistence of data within the buffers 38A–38P without otherwise affecting the system. One technique for increasing data persistence in the buffers 38A–38P, and thereby increasing the probability that subsequent requests will be able to take advantage of the data stored in the buffers 38A–38P, is by exhausting the assignment of the buffers 38A–38P before a particular buffer is reused. Thus, if a first buffer 38A contains data and the second buffer 38B is empty, the data is advantageously stored in the second buffer 38B, even if the first buffer 38A had been freed for reuse. This will maximize the potential for data reuse and thereby decrease read latency. Further, if a first freed buffer 38C contains coherent data that can be reused if a subsequent request seeks that data (data qualifying for reuse will be discussed further below) and a second freed buffer 38D contains data that does not qualify for reuse, the data may be advantageously stored in the second buffer 38D. This will again maximize the potential for data reuse and thereby decrease read latency. Thus, by allocating buffers 38A–38P based at least partially on the aforementioned rules, data may ultimately persist in the buffers 38A–38P long enough to be reused. One or both of these techniques may be implemented in the host controller 16 by monitoring the data stored in the buffers 38A–38P. In one embodiment, the memory controller MCON monitors the use of the buffers 38A–38P. As can be appreciated by those skilled in the art, flag bits may be set to indicate the type of data being stored in the buffers 38A–38P and a simple state machine may be implemented to coordinate the reassignment rules for the buffers 38A–38P. This concept will be better understood through the discussion below.

Another mechanism for maximizing data persistence is by using one or more of the buffers 38A–38P as "hot buffers." Essentially, one or more of the buffers 38A–38P may be used as a sort of cache for frequently accessed data or data that is reused on subsequent requests. For qualifying requests (explained further below) the data which is retrieved from the memory 20 or one of the processor caches may be purposely retained in the buffer 38A–38P, even after it has been delivered to the requesting device. In other words, the buffer 38A–38P may not re-allocated or freed for reuse after the requested data is delivered and thus not subject to re-allocated in accordance with the previously described reassignment techniques. Instead, the data persists in the buffer 38A–38P so that access to the data is even faster for a subsequent request seeking that data since the data is already in the host/data controller 16, 18 and can simply be fetched from the hot buffer, rather than memory 20 or cache memory. A hot buffer may be reserved for a number of cycles, regardless of the previously discussed re-assignment rules. The specific implementation of the presently described technique will be discussed more specifically with reference to FIGS. 3–9 below.

As a preliminary matter, not all data associated with a particular request qualifies as the type of data that should be assigned to a hot buffer for possible reuse. If data is going to be reused on subsequent read requests to the same address (i.e. requests for the same data), the host controller 16 may advantageously only reserve a hot buffer for requests of a type that may not be overwritten. If, for instance, the requested data is of a type that can be overwritten by a CPU 12A–12H, for example, the data will not qualify as the type that can be reused and thus, will not be allocated as hot buffer data. This qualification of potential hot buffer data prevents data from being delivered to a requesting device from the buffers 38A–38P if the data in the buffers 38A–38P is not the most current data. Different systems may implement different flags to identify a request or transaction type. However, in the present system, data that cannot be modified by a processor or requesting device is said to be in a "shared state," in accordance with the standard MESI protocol. As can be appreciated by those skilled in the art, MESI protocol refers to a cache coherency protocol wherein in cacheline is marked with one of the four states: Modified, Exclusive, Shared or Invalid. If a shared flag or bit is set in a request, the corresponding data is essentially read only data that cannot be modified or overwritten. It is this type of shared state data that qualifies as potential persistent data that can be retained in a buffer 38A–38P for reuse by subsequent requests, thereby creating a "persistence" or "hot" buffer.

Turning now to FIGS. 3 and 4–9, an exemplary flow chart and system describing request processing in accordance with embodiments of the present techniques are illustrated. Accordingly, FIGS. 3 and 4–7 are described together. An exemplary read request processing technique is initially discussed with reference to FIGS. 3–7. After the preliminary process flow discussion, the advantageous techniques disclosed herein are further described with reference to FIGS. 3–7 and with further reference to FIGS. 8 and 9.

Figures 3, 4, 5, 6, 7:
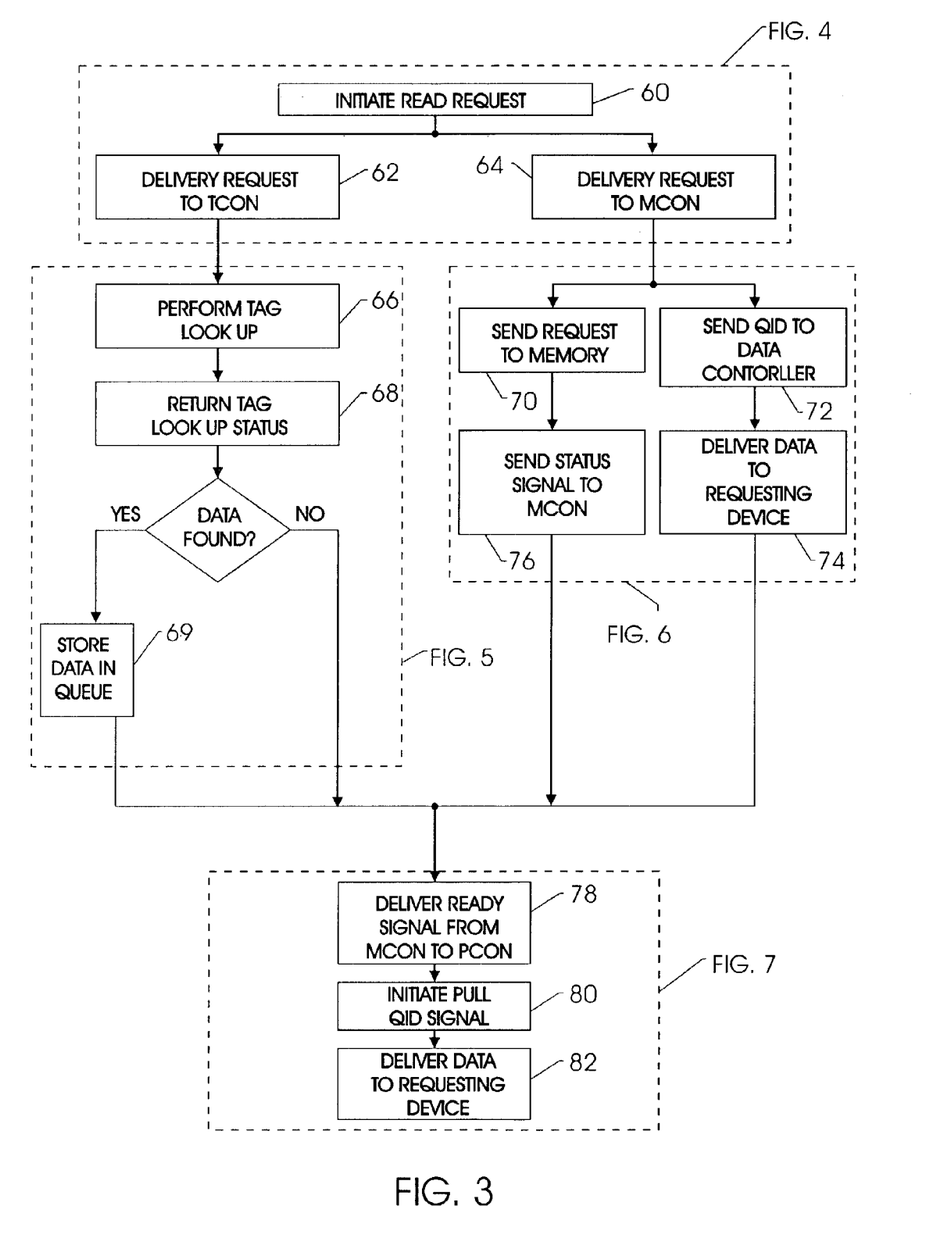
FIG. 3 is a flow chart illustrating a method of processing requests in a computer system in accordance with embodiments of the present invention.
FIGS. 4–9 are block diagrams of an exemplary computer system and method for processing requests in accordance with embodiments of the present invention.
Figure 4:
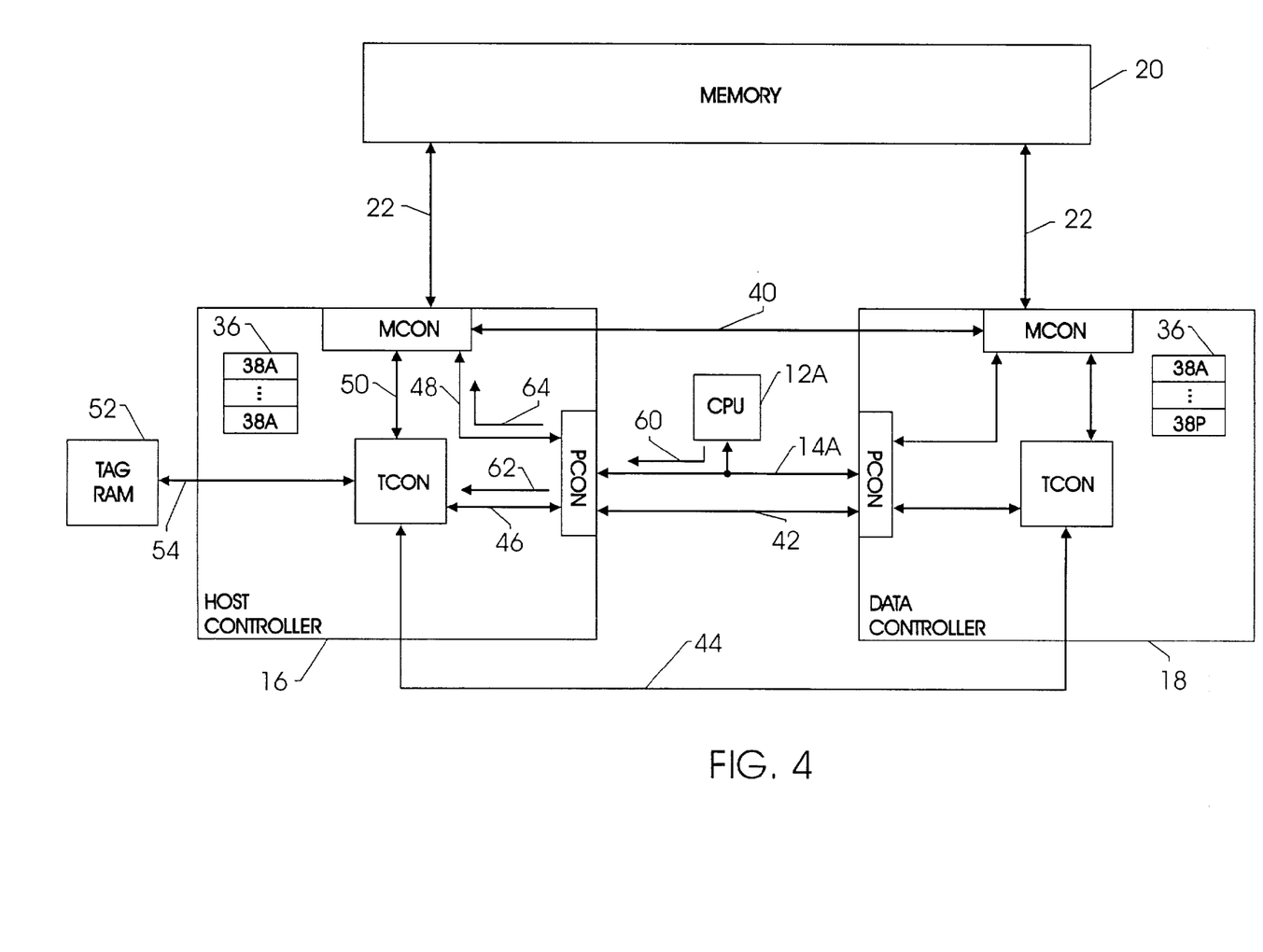
Figure 5:
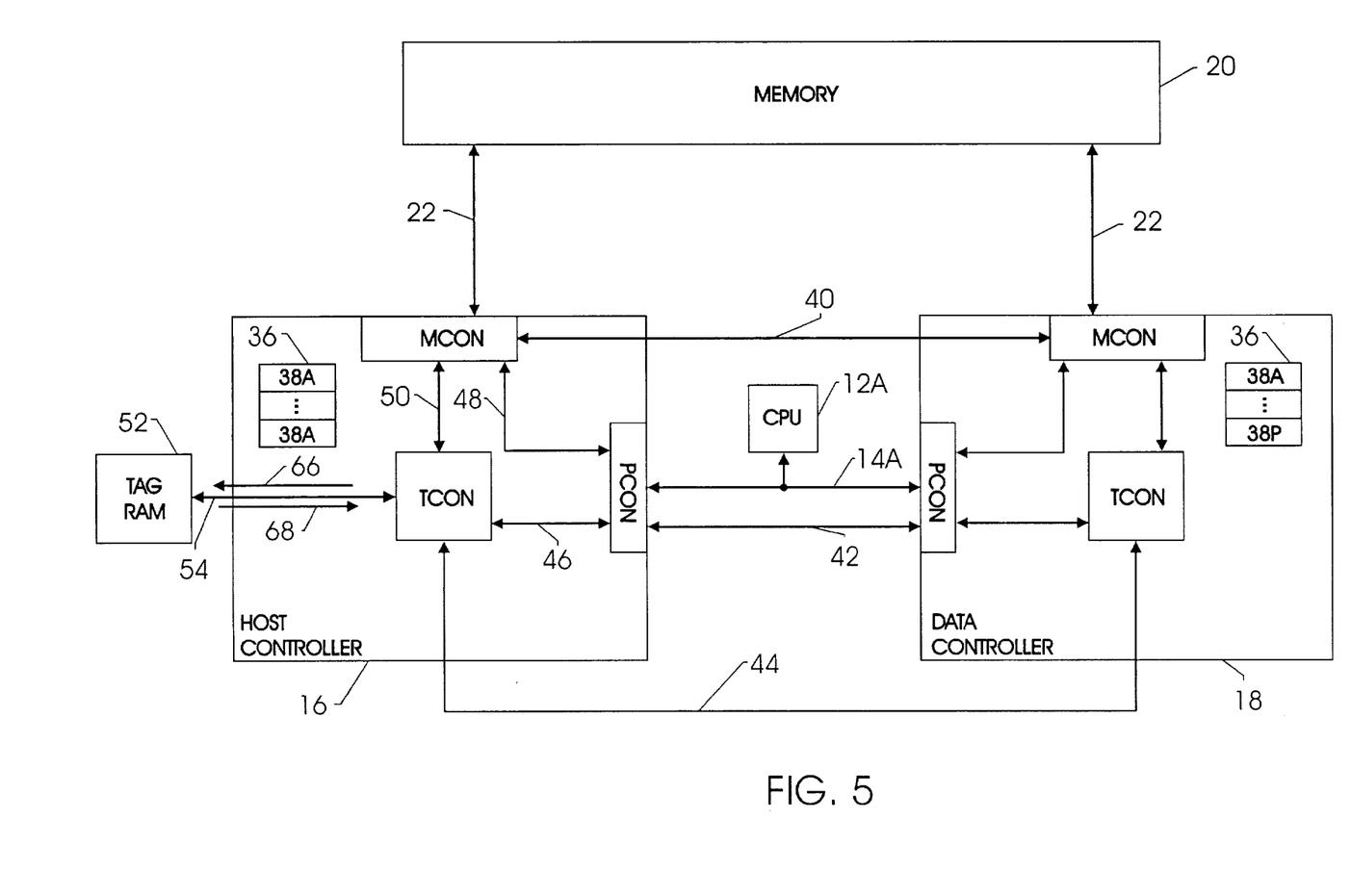
Figure 6:
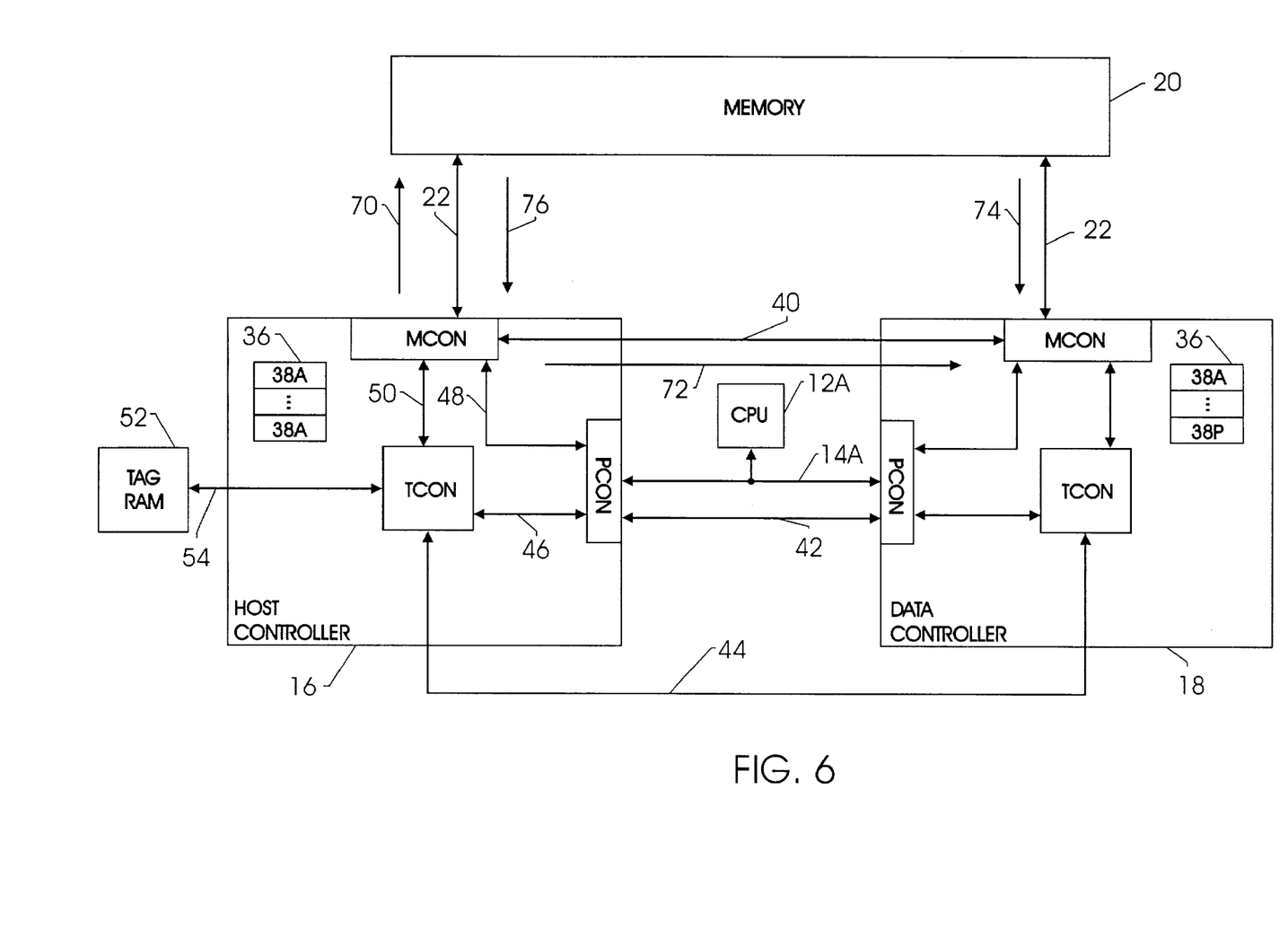
Figure 7:
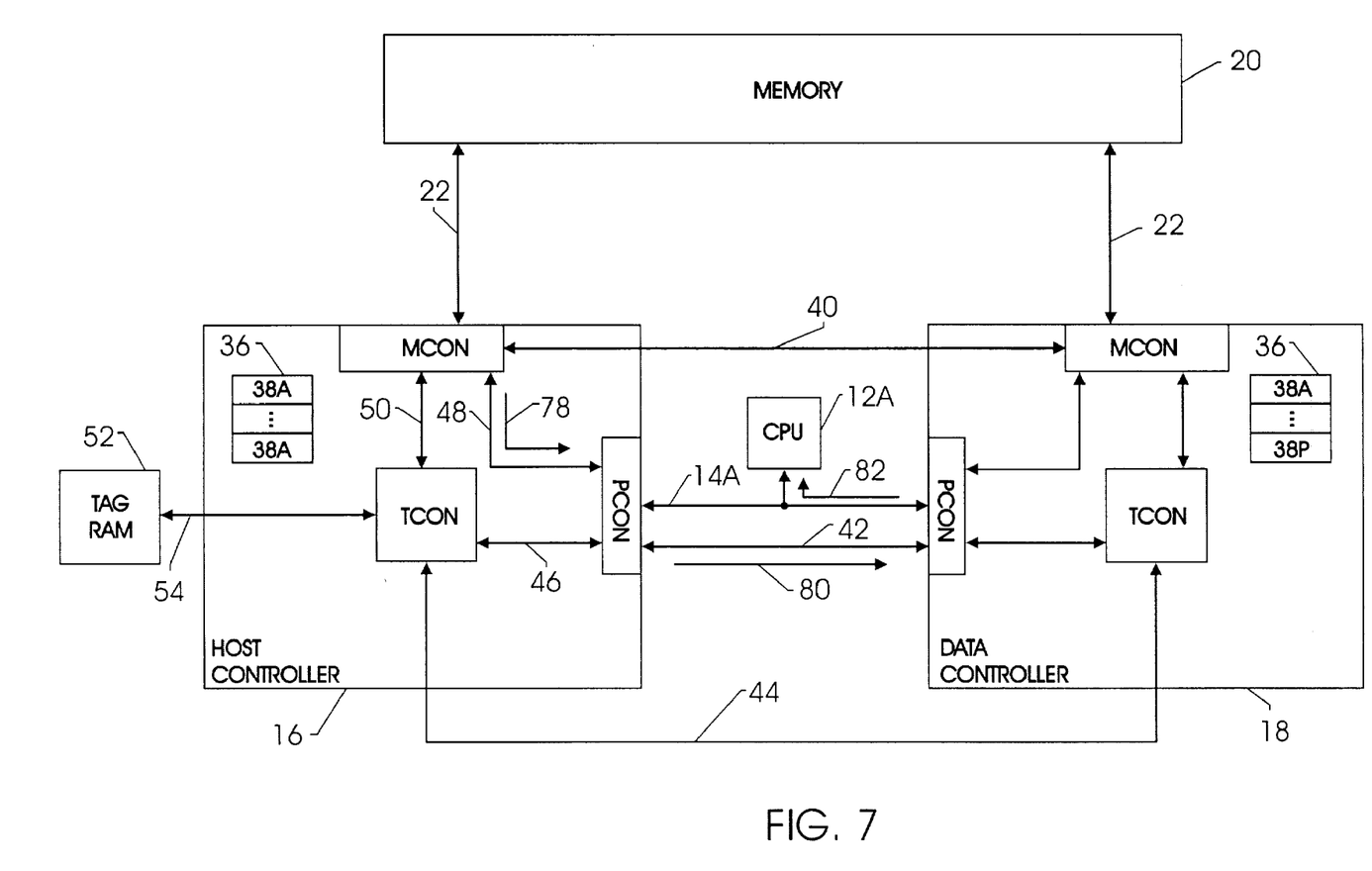

Referring initially to FIG. 4, a portion of the system 10 is illustrated. To better illustrate the request processing technique, the host controller 16, data controller 18, memory 20 and an exemplary requesting device, such as the processor 12A are illustrated. As previously described, the host controller 16 and data controller 18 are closely linked in a master/slave relationship. Accordingly, many of the components illustrated in the host controller 16 may also be illustrated in the data controller 18 since these components may include a companion component in each of the host/data controller 16, 18. Each of the respective components includes a dedicated interface to a corresponding companion component. Thus, the memory controller MCON illustrated in each of the host controller 16 and data controller 18 includes a dedicated MCON interface 40 for communication between the companion memory controllers MCON. Similarly, the processor controller PCON has a dedicated PCON interface 42. In the present exemplary embodiment, there is no tag controller TCON in the data controller 18 since the tag controller TCON does not provide any temporary data storage. Further, each of the controllers in the host/data controller 16, 18 may be connected via internal buses to facilitate the exchange of information, requests and data throughout the host/data controller 16, 18. Accordingly, an internal bus 46 may provide for communication between the processor controller PCON and the tag controller TCON. Similarly, an internal bus 48 may provide for communication between the processor controller PCON and the memory controller MCON. Finally, a bus 50 provides for communication between the tag controller TCON and the memory controller MCON.

For simplicity, the processor controller PCON has been illustrated as a single entity since the functionality of each of the processor controllers PCON0–PCON2 is essentially the same. While a single requesting device, here the CPU 12A is illustrated, it should be understood that subsequent requests may come from any of the CPUs 12A–12H or peripheral devices 30A–30B, 32A–32B, or 34A–34B. Thus, the general description of the corresponding processor controller PCON is applicable to requests coming from any of the aforementioned devices and processed by their respective processor controller PCON0–PCON2.

Referring initially to FIGS. 3 and 4, a request is initiated from the CPU 12A to the host controller 16, as indicated in block 60 of FIG. 3 and corresponding indicator arrow 60 in FIG. 4. The request may be delivered from the CPU 12A to the processor controller PCON via the processor bus 14A. In the present example, it is assumed that the request is a READ request whose data will ultimately be found to be in the shared state and is thus a candidate for reuse. Next, the request is sent from the processor controller PCON to the tag controller TCON via the internal bus 46, as indicated in block 62 of FIG. 3 and corresponding indicator arrow 62 in FIG. 4. Simultaneously, the request is sent from the processor controller PCON to the memory controller MCON via the internal bus 48, as indicated in block 64 of FIG. 3 and corresponding indicator arrow 64 in FIG. 4. As previously described, the request may be delivered to each of the tag controller TCON and the memory controller MCON to facilitate the simultaneous search for the requested data in each of the main memory 20 and the processor caches. Alternatively, the request may be sent to each of the processor controller PCON and the tag controller TCON in succession rather than simultaneously.

Referring to FIGS. 3 and 5, in some embodiments, after the request is delivered to the tag controller TCON (block 62 in FIG. 3 and indicator arrow 62 in FIG. 4), the tag controller TCON performs a tag lookup, as indicated in block 66 of FIG. 3 and corresponding indicator arrow 66 in FIG. 5. The tag lookup refers to the tag controller TCON sending a search request to the tag RAM 52 via the tag bus 54 to determine whether the data requested by the CPU 12A is stored in one of the processor caches. The tag RAM 52 returns a tag lookup status to the tag controller TCON, as indicated in block 68 of FIG. 3 and corresponding indicator arrow 68 in FIG. 5. If the tag lookup status indicates that the data is stored in one of the processor caches and thus, can be retrieved quickly, the data may be retrieved from the corresponding processor cache and returned to the host/data controller 16, 18. The data may be stored in a buffer 38A–38P in the queue 36 to await transfer to the requesting device. If the tag identification for the request is found in the tag RAM 52, the co-pending request to the memory controller MCON (block 64 in FIG. 3 and indicator arrow 64 in FIG. 4) can be canceled since the requested data can be retrieved from the processor cache more quickly that the main memory 20. As previously described, if the requested tag identification is found in the tag RAM 52, the requested data may be retrieved from the corresponding processor cache and stored in the queue 36, as indicated in block 69 of FIG. 3. If however, the requested tag identification is not found in the tag RAM 52, the tag lookup status will indicate that the requested data is not currently stored in the cache memory, and the concurrent search to main the main memory 20 continues.

Referring to FIGS. 3 and 6, in some embodiments, after the request is delivered to the memory controller MCON (block 64 in FIG. 3 and indicator arrow 64 in FIG. 4), the request is delivered from the memory controller MCON to the memory 20 via the memory bus 22, as indicated in block 70 of FIG. 3 and corresponding indicator arrow 70 in FIG. 6. Further, the memory controller MCON may also send a queue identification ("QID") to its corresponding slave component in the data controller 18 via the dedicated MCON interface 40, as indicated in block 72 of FIG. 3 and corresponding indicator arrow 72 in FIG. 6. The QID provides the address of the queue 36 and buffer 38A–38P to which the requested data may be delivered and temporarily stored while awaiting transfer to the requesting device. As will be discussed below, the memory controller MCON may track the assignment of the buffers 38A–38P, including a hot buffer which may be allocated. Typically, the memory controller MCON provides a corresponding buffer 38A–38P selection when the request is issued to memory 20. Thus, when the request is sent to the memory 20, the corresponding QID may also be delivered to the memory 20 to indicate where the data should be sent.

The requested data may be sent from the memory 20 to the buffer 38A–38P in the data controller 18 corresponding to the QID assigned by the memory controller MCON, as indicated in block 74 of FIG. 3 and corresponding indicator arrow 74 in FIG. 6. Once the data is sent from the memory 20, to the corresponding buffer 38A–38P, the memory 20 may deliver a status signal to the memory controller MCON in the host controller 16, via the memory bus 22, indicating that the requested data has been delivered to the data controller 18. The initiation of the status signal to the memory controller MCON is indicated in block 76 of FIG. 3 and corresponding indicator arrow 76 in FIG. 6.

Referring to FIGS. 3 and 7, in some embodiments, once the requested data is sent from the memory 20 to the assigned buffer 38A–38P (block 74 of FIG. 3 and indicator arrow 74 in FIG. 6), the memory controller MCON may deliver a READY signal and the QID of the MCON queue to the processor controller PCON via the internal bus 48, indicating that the requested data is waiting in the data controller 18 and ready to be sent to the requesting device. The delivery of the READY signal is indicated in block 73 in FIG. 3 and corresponding indicator arrow 78 in FIG. 7. The processor controller PCON sends a PULL QID signal to its slave component in the data controller 18, as indicated in block 80 in FIG. 3 and corresponding indicator arrow 80 in FIG. 7. The PULL QID signal initiates the "pulling" or reading of the data corresponding to the QID (stored in the assigned buffer 38A–38P) from the buffer 38A–38P to the requesting device, here the CPU 12A. The delivery of the requested data is indicated in block 82 of FIG. 3 and corresponding indicator arrow 82 in FIG. 7. At this point, the buffer 38A–38P is generally freed for reuse in a subsequent request. However, as indicated above and as discussed further below, it may be advantageous to allow the data to persist in the buffer 38A–38P in accordance with the present techniques discussed in more detail below.

For the purpose of illustrating the present technique of implementing the hot buffer, assume that the aforementioned request from the CPU 12A is of the type that qualifies as data that can persist in the queue 36 for reuse in subsequent requests. As previously described, one of the criteria that may be used to determine whether the requested data is of the type that may be reused, is that the data is shared data and thus cannot be overwritten (modified). If the request corresponds to data in the shared state, as it does here, the buffer 38A–38P is a candidate for designation as a hot buffer.

As can be appreciated, the host controller 16 may receive numerous requests simultaneously or within a short period of time. At any given time, there may be a number of requests waiting to be processed. The requests may be stored in a request processing queue (not shown) in the host controller 16, until the requests are processed. In one embodiment of the present technique, the tag controller TCON monitors the request processing queue and constantly compares the addresses and request type corresponding to each of the requests. If the request type of one of the requests is in the shared state (i.e. read only), and there is more than one request to that corresponding data, a hot buffer may be activated. Once the tag controller TCON has determined that there are multiple read requests to the same address waiting to be processed and that the requests correspond to shared data, one of the buffers 38A–38P can be designated as a hot buffer where the corresponding data can be stored and reused.

Figure 8:
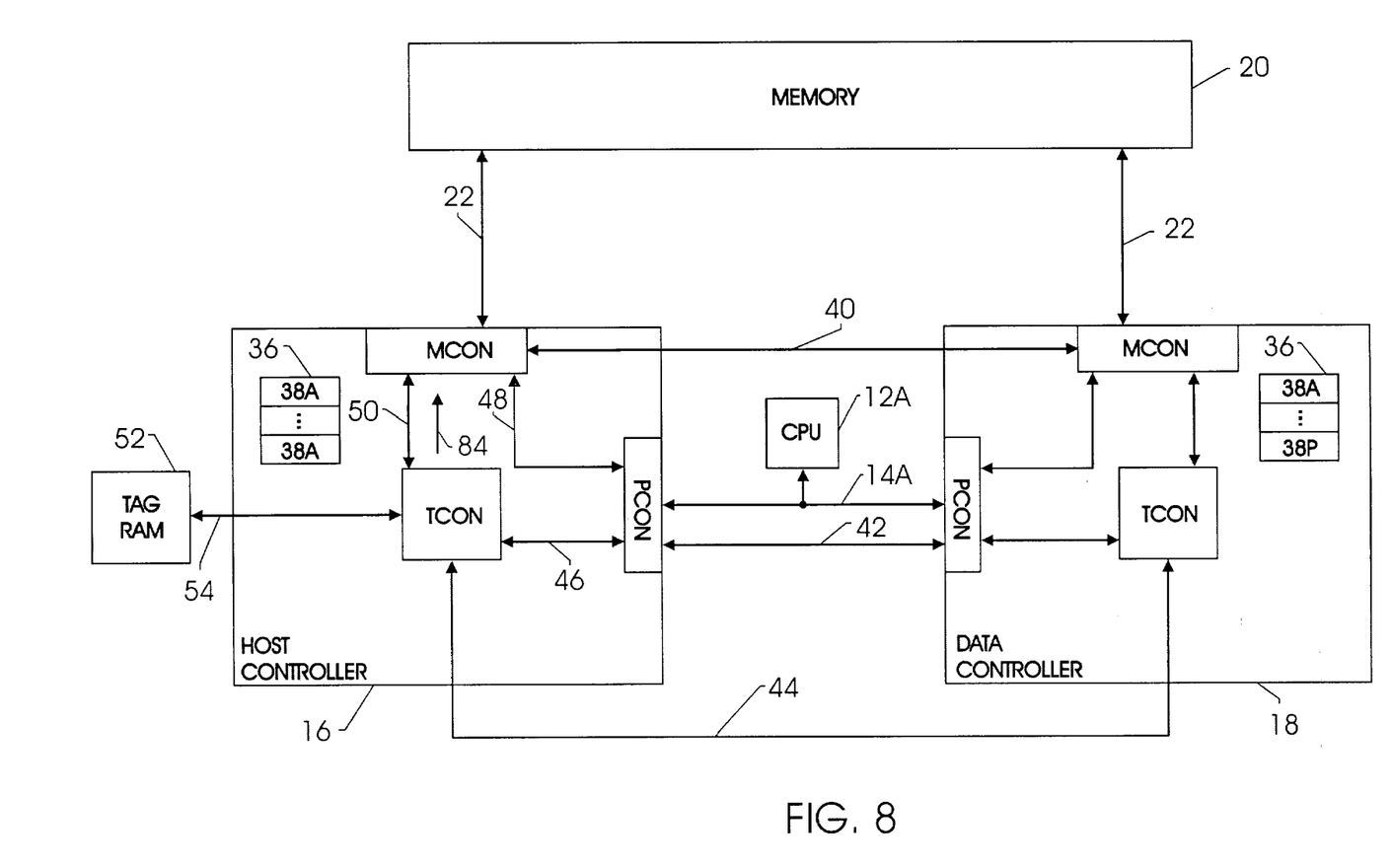
Figure 9:
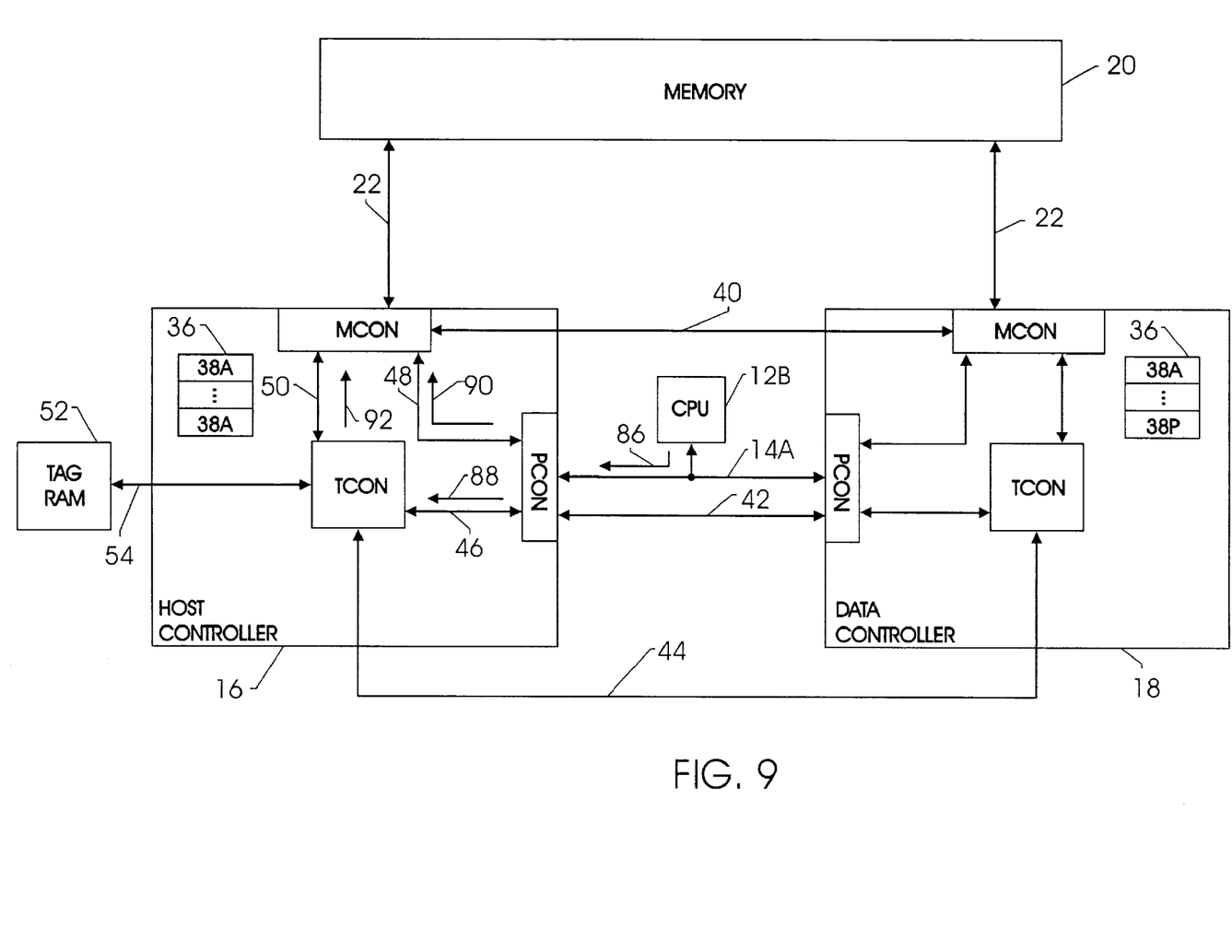

Initially, in some embodiments, none of the buffers 38A–38P may be designated as hot buffers, and request processing is generally implemented in accordance with FIGS. 3–7. FIGS. 8 and 9 illustrate one technique for implementing a hot buffer. Once the tag controller TCON determines that data reuse may be advantageous, the tag controller TCON sets a BEGIN bit on the corresponding request. The tag controller TCON issues the BEGIN flag to the memory controller MCON via the internal bus 50, as illustrated by indicator arrow 84 in FIG. 8. The BEGIN flag notifies the memory controller MCON to track the assigned buffer 38A–38P in which the data corresponding to the request (previously discussed with reference to indicator arrow 64 illustrated in FIG. 4) may ultimately be stored. Thus, in some embodiments, the BEGIN flag corresponds to the data requested by indicator arrow 64.

For the purpose of illustration, the data corresponding to the request is stored in the buffer 38A. As previously described, in some embodiments of the present system, it may be advantageous to designate only a single buffer, here the buffer 38A, as a hot buffer with persistent data, at any given time. With the BEGIN bit set by the tag controller TCON, the memory controller MCON may designate the buffer assigned to store the requested data, here buffer 38A, as the hot buffer. Accordingly, the memory controller MCON may not re-assign the hot buffer 38A for storage of data associated with a subsequent read request even after the original request has been completed. Instead, the data corresponding to the request may persist in the hot buffer 38A until a releasing event occurs to release the buffer 38A from its designation as a hot buffer 38A. A number of exemplary releasing events will be discussed below.

With the designation of hot buffer 38A, subsequent requests to the address containing the shared data now stored in the hot buffer 38A may be retrieved from the hot buffer 38A rather than the main memory 20, thereby typically reducing the latency period associated with a subsequent request. FIG. 9 illustrates a subsequent request being initiated from a CPU 12B, for example. The requesting device may be any of the CPUs 12A–12H, or I/O devices 30A–30B, 32A–32B and 34A–34B in the system. The subsequent request from CPU 12B may be delivered to the processor controller PCON via the processor bus 14A, as illustrated by indicator arrow 86. In this example, it is assumed that the subsequent request corresponds to the same data that is stored in the hot buffer 38A. When the processor controller PCON receives the request, the request is delivered to the tag controller TCON, as illustrated by indicator arrow 88, and the memory controller MCON, as illustrated by indicator arrow 90 (as previously described in FIG. 4, with respect to indicator arrows 62 and 64, respectively). The tag controller TCON recognizes the address corresponding the subsequent request and may set a USE flag on the subsequent request. The USE flag may be delivered from the tag controller TCON to the memory controller MCON via the internal bus 50, as illustrated by indicator arrow 92. By setting the USE bit on the subsequent request, the tag controller TCON may provide a flag to the memory controller MCON indicating that the data sought by the corresponding subsequent request resides in the buffer reserved for persistence data, here the hot buffer 38A. Rather than initiating a request from the memory controller MCON to the memory 20 to fetch the data (as discussed previously in FIG. 6 with specific reference to indicator arrow 70), the memory controller MCON may skip blocks 70, 72, 74 and 76 (discussed with reference to FIGS. 3 and 6) and deliver the READY signal from the memory controller MCON to the processor controller PCON (block 78 of FIG. 3), indicating that the requested data is stored in the queue 36 and may be ready to be sent to the requesting device, here the CPU 12B. Likewise, for a request wherein the USE flag is set by the tag controller TCON, no tag lookup may be necessary. Read request latency is thereby typically reduced.

To release the buffer 38A from its designation as a hot buffer 38A wherein data persists, any one of a number of releasing events may be implemented. In some embodiments, the hot buffer 38A may remain active as long as there are USE bits set in the entries in the queue 36. Once the last entry having an active USE bit is processed, the hot buffer 38A may be automatically released, and a new hot buffer may be initiated as described above.

Another mechanism for releasing the hot buffer 38A is to implement a time-out condition. For example, if the data stored in the hot buffer 38A is not accessed within a certain time period, e.g. 1000 nano-seconds or 100 clock cycles, the tag controller TCON can reset the BEGIN bit corresponding to the request in the hot buffer 38A and the data can then be overwritten by subsequent requests (i.e., the buffer 38A is no longer designated as a hot buffer).

Still another mechanism for releasing the hot-buffer is to implement a monitor in the tag controller TCON to monitor the incoming requests to determine which address is the "hottest" or most requested. If a requested data address is hotter over a period of time, e.g. 1000 nano-seconds or 100 clock cycles, the tag controller TCON can reset the BEGIN bit corresponding to the request in the hot buffer 38A and re-assign the hotter data as the data to be stored in the hot buffer 38A (or any other designated buffer which would then serve as the hot buffer). By retaining the data corresponding to the most requested address in the hot buffer 38A, system performance can be further improved.

It may also be desirable to release a hot buffer 38A if the data stored therein becomes invalid. If a bus initiates a bus read invalidate line (BRIL) or bus write invalidate line (BWIL) to the address corresponding to the data retained in the hot buffer 38A, one of the CPUs 38A–38H may overwrite the data stored in the main memory 20 or cache memory, thus, the data stored in the hot buffer 38A may no longer be valid. Accordingly, the tag controller TCON may stop activating USE bits corresponding to the address of the data stored in the hot buffer 38A and clear the BEGIN bit indicating that the data is no longer valid for reuse, thereby releasing the buffer 38A from designation as a hot buffer.

To further optimize performance by reducing read latency, the tag controller TCON may monitor the data stored in the each of the buffers 38A–38P. Aside from assigning one of the buffers 38A–38P as a hot buffer, the tag controller TCON may compare each incoming read request to the data stored in the queue 36. By following the rules described above (i.e. rotating through all buffers before a particular buffer is reused and reusing buffers which store non-coherent data before reusing buffers storing coherent data), the likelihood of data persisting long enough to be reused is increased. As each request is received by the tag controller TCON, the tag controller TCON may compare the request with the data currently stored in the queue 36, and if the requested data may be found in one of the buffers 38A–38P in the queue 36, the data may be retrieved from the corresponding buffer 38A–38P rather than the cache memory or main memory 20, as previously discussed.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of processing requests comprising:
    storing a plurality of requests in a request processing queue in a host/data controller;
    setting a begin flag in a first of the plurality of requests;
    retrieving data from memory, the data corresponding to the first of the plurality of requests;
    storing the data in a hot buffer in the host/data controller;
    for each of the plurality of requests corresponding to the data, delivering the data from the hot buffer to a requesting device without re-retrieving the data from the memory;
    storing subsequent requests in the request processing queue;
    comparing each of the plurality of subsequent requests to the data stored in the hot buffer; and
    for each of the plurality of subsequent requests corresponding to the data stored in the hot buffer, delivering the data from the hot buffer to a requesting device.

2. The method of processing requests, as set forth in claim 1, wherein setting the begin flag comprises setting the begin flag in a read request.

3. The method of processing requests, as set forth in claim 1, wherein retrieving comprises retrieving shared data from memory, the shared data corresponding to the first of the plurality of requests.

4. The method of processing requests, as set forth in claim 1, comprising for each of the plurality of requests corresponding to the data, setting a re-use flag in the request, the re-use flag indicating that the data should be retrieved from the hot buffer.

5. A method of processing requests comprising:
    transferring requested data sets from a storage location to a host/data controller for each of a plurality of corresponding requests;
    storing each of the requested data sets in a respective buffer in the host/data controller;
    tracking the data sets stored in each of the respective buffers; and
    for a subsequent request for a data set currently stored in one of the respective buffers, delivering the data set from the one of the respective buffers to a device initiating the subsequent request, wherein storing comprises implementing a state machine to determine which of the respective buffers will store each of the respective data sets.

6. The method of processing requests, as set forth in claim 5, wherein transferring comprises transferring the requested data sets from a processor cache to the host/data controller.

7. The method of processing requests, as set forth in claim 5, wherein transferring comprises transferring the requested data sets from a random access memory (RAM) device.

8. The method of processing requests, as set forth in claim 5, comprising:
    dynamically designating one of the buffers as a persistence buffer configured to store one of the requested data sets;
    storing the one of the requested data sets in the persistence buffer, wherein the one of the requested data sets corresponds to a first request; and
    retaining the one of the requested data sets in the persistence buffer after the requested data set is delivered to a requesting device and until a releasing event occurs.

9. The method of processing requests, as set forth in claim 8, comprising delivering the one of the requested data sets from the persistence buffer to a requesting device in response to a second request.

10. The method of processing requests, as set forth in claim 8, wherein retaining comprises retaining the one of the requested data sets in the persistence buffer until a timer expires.

11. The method of processing requests, as set forth in claim 8, wherein retaining comprises retaining the one of the requested data sets in the persistence buffer until one of a bus read and invalidate line (BRIL) and a bus write and invalidate line (BWIL) is issued for the one of the requested data sets.

12. The method of processing requests, as set forth in claim 8, wherein retaining comprises retaining the one of the requested data sets in the persistence buffer until none of the plurality of corresponding requests corresponds to the one of the requested data sets.

13. A method of processing requests in a system having a host/data controller comprising:
    receiving a first request at a processor controller (PCON);
    delivering the first request from the PCON to each of a tag controller (TCON) and a memory controller (MCON);
    searching the system for data corresponding to the first request;
    storing the data corresponding to the first request in a buffer in the host/data controller;
    setting a begin flag in the buffer, thereby creating a hot buffer; and
    directing all subsequent requests for the data to the hot buffer, wherein directing comprises setting a use flag in the subsequent requests for the data.

14. The method of processing requests, as set forth in claim 13, wherein searching comprises searching main memory for data corresponding to the first request.

15. The method of processing requests, as set forth in claim 13, wherein searching comprises searching a processor cache for data corresponding to the first request.

16. A host/data controller comprising:
    a plurality of buffers configured to temporarily store data during processing of a first plurality of read requests;
    a first controller electrically coupled to the plurality of buffers and configured to assign a corresponding buffer to each of the corresponding read requests; and
    a second controller electrically coupled to the plurality of buffers and configured to receive a second plurality of read requests and further configured to fetch data from the buffers without retrieving the data from an external location with respect to the host/data controller in response to any one of the second plurality of read requests and further configured to retain the fetched data in the buffer until a releasing event occurs.

17. The host/data controller, as set forth in claim 16, wherein the first controller comprises a memory controller (MCON).

18. The host/data controller, as set forth in claim 17, wherein the memory controller (MCON) is configured to retrieve the data corresponding to the first plurality of read requests from memory.

19. The host/data controller, as set forth in claim 16, wherein the second controller comprises a tag controller (TCON).

20. The host/data controller, as set forth in claim 19, wherein the tag controller (TCON) is configured to designate one of the plurality of buffers as a hot buffer.

21. The host/data controller, as set forth in claim 20, wherein the tag controller (TCON) is configured to designate the hot buffer by setting a first flag bit in the corresponding data assigned to the hot buffer.

22. The host/data controller, as set forth in claim 21, wherein the first flag bit comprises a BEGIN flag bit.

23. The host/data controller, as set forth in claim 20, wherein the tag controller (TCON) is configured to fetch the corresponding data assigned to the hot buffer in response to one of the second plurality of requests.

24. The host/data controller, as set forth in claim 21, wherein the tag controller (TCON) is configured to fetch the corresponding data assigned to the hot buffer in response to one of the second plurality of requests by setting a second flag bit in the one of the second plurality of requests.

25. The host/data controller, as set forth in claim 24, wherein the second flag bit comprises a USE flag bit.

26. The host/data controller, as set forth in claim 24, wherein the second controller is configured to discard the second flag bit set in the one of the second plurality of requests.

* * * * *

UNITED STATES PATENT AND TRADEMARK OFFICE
CERTIFICATE OF CORRECTION

PATENT NO. : 7,120,758 B2
APPLICATION NO. : 10/365018
DATED : October 10, 2006
INVENTOR(S) : Phillip M. Jones et al.

Page 1 of 1

It is certified that error appears in the above-identified patent and that said Letters Patent is hereby corrected as shown below:

In column 2, line 64, after "controller 18" insert -- may be --.

In column 5, lines 50-51, delete "re-allocated" and insert -- re-allocation --, therefor.

In column 8, lines 34-35, after "block" delete "73 in" and insert -- 78 of --, therefor.

Signed and Sealed this

Twenty-fourth Day of March, 2009

JOHN DOLL
*Acting Director of the United States Patent and Trademark Office*